(12) United States Patent
Winger et al.

(10) Patent No.: US 7,688,895 B2
(45) Date of Patent: Mar. 30, 2010

(54) METHOD AND/OR CIRCUIT FOR BINARY ARITHMETIC DECODING DECISIONS BEFORE TERMINATION

(75) Inventors: Lowell L. Winger, Waterloo (CA); Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 1081 days.

(21) Appl. No.: 10/624,253

(22) Filed: Jul. 22, 2003

(65) Prior Publication Data

US 2005/0018774 A1    Jan. 27, 2005

(51) Int. Cl.
*H04N 7/18*    (2006.01)

(52) U.S. Cl. ............... 375/240.25; 375/240.26; 375/240.23; 375/240.24

(58) Field of Classification Search ............... 375/240.01–240.29
See application file for complete search history.

(56) References Cited

U.S. PATENT DOCUMENTS

| | | | |
|---|---|---|---|
| 5,025,258 A | 6/1991 | Duttweiler | 341/107 |
| 5,099,440 A | 3/1992 | Pennebaker et al. | 364/554 |
| 5,376,968 A * | 12/1994 | Wu et al. | 375/240.14 |
| 5,821,986 A * | 10/1998 | Yuan et al. | 348/14.12 |
| 6,646,578 B1 * | 11/2003 | Au | 341/67 |
| 6,894,628 B2 * | 5/2005 | Marpe et al. | 341/107 |
| 7,154,952 B2 * | 12/2006 | Tourapis et al. | 375/240.16 |
| 7,190,289 B2 * | 3/2007 | Kobayashi et al. | 341/107 |
| 2004/0085233 A1 | 5/2004 | Linzer et al. | |
| 2004/0263340 A1 | 12/2004 | Pearson et al. | |
| 2004/0268329 A1 * | 12/2004 | Prakasam | 717/141 |
| 2005/0008240 A1 * | 1/2005 | Banerji et al. | 382/238 |
| 2006/0126744 A1 * | 6/2006 | Peng et al. | 375/240.26 |

* cited by examiner

*Primary Examiner*—Andy S Rao
(74) *Attorney, Agent, or Firm*—Christopher P. Maiorana, PC

(57) ABSTRACT

A method for decoding a bitstream is disclosed. The method generally comprises the steps of (A) generating a first signal and a second signal by parsing a common slice in the bitstream, (B) generating a third signal by entropy decoding the first signal, and (C) generating a video signal by combining the second signal and the third signal.

30 Claims, 5 Drawing Sheets

METHOD AND/OR CIRCUIT FOR BINARY ARITHMETIC DECODING DECISIONS BEFORE TERMINATION

FIELD OF THE INVENTION

The present invention relates to a digital video processing generally and, more particularly, to a method for binary arithmetic decoding decisions before termination.

BACKGROUND OF THE INVENTION

The proposed H.264 video coding includes an I_PCM (intra-frame pulse code modulation) macroblock coding mode. While video compression techniques attempt to compress every macroblock of a video sequence, there is no guarantee that individual macroblocks will in fact be compressed. In practice, white noise will be expanded to some extent by compression techniques.

The I_PCM mode in the current H.264 specification provides a coding mode that guarantees a limit on the expansion of white noise during compression. The I_PCM mode provides a mechanism for an encoder to potentially more easily produce a bistream that guarantees a maximum number of bits per macroblock, thereby potentially enabling simpler decoding hardware that takes advantage of the guaranteed limitation.

The I_PCM mode generates the actual values of the pixels contained in a 16×16 macroblock, rather than attempting to compress the information. The I_PCM mode is a type of "fail safe" mode that bounds the size of a macroblock in the compressed video bitstream. While PCM coding has been implemented in the past, H.264 is the first instance where an I_PCM macroblock mode is incorporated into a video encoder/decoder (CODEC) that switches between PCM and non-PCM coding modes.

The current H.264 proposal does not provide a provision to bypass the context adaptive arithmetic entropy encoding (CABAC) stage for I_PCM mode encoded macroblocks. An idea behind the I_PCM mode is to avoid all compression. Therefore, it would be beneficial to bypass the entropy encoding stage for bits that belong to an I_PCM mode macroblock.

Solutions to the above problem existed in some early versions of the H.264 standard. The current H.264 solution is that when context-based adaptive binary arithmetic coding (CABAC) is terminated, the next bit to be decoded must be a single specific syntax element (i.e., RBSP_STOP_ONE_BIT). For example, if an offset value (i.e., CODIOFFSET) is larger than or equal to a range value (i.e., CODIRANGE), a value of 1 is assigned to a value (i.e., BINVAL), no renormalization is carried out and the CABAC encoding is terminated. In such a case, the last bit inserted in register RBSP_STOP_ONE_BIT is the offset value CODIOFFSET.

The disadvantage of such an approach is a lack of an ability to terminate the CABAC encoding prior to sending an I_PCM mode macroblock unless the slice being encoded is also terminated at the same time. For an I_PCM mode macroblock, the next bit decoded after terminating the CABAC encoding could be either a syntax element (i.e., PCM_ALIGNMENT_ZERO_BIT), or a first bit of the syntax element (i.e., PCM_BYTE).

The existing solutions disallow CABAC encoded slices that contain any I_PCM mode macroblocks. To use the I_PCM mode with the existing solutions, the current slice must first be terminated, and then a new slice begun with an I_PCM mode macroblock.

There are typically many bits of overhead associated with terminating an existing slice and beginning a new slice since a new slice header must be transmitted. For broadcast applications in which the overhead bits needed by many small slices are not needed for error resilience (i.e., with internet streaming applications) the existing approaches carry an undesirable penalty in overhead.

It would be desirable to implement a method and/or circuit that effectively bypasses the entropy encoding stage in an H.264 compliant CODEC for bits that belonged to an I_PCM mode macroblock.

SUMMARY OF THE INVENTION

The present invention concerns a method for decoding a bitstream. The method generally comprises the steps of (A) generating a first signal and a second signal by parsing a common slice in the bitstream, (B) generating a third signal by entropy decoding the first signal, and (C) generating a video signal by combining the second signal and the third signal.

The objects, features and advantages of the present invention include providing a method and circuit that may (i) bypass the entropy decoding stage as needed, (ii) be used in an I_PCM macroblock, (iii) be compliant with an H.264 CODEC, and/or (iv) efficiently decompress bitstreams containing CABAC mode and I_PCM mode macroblocks.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
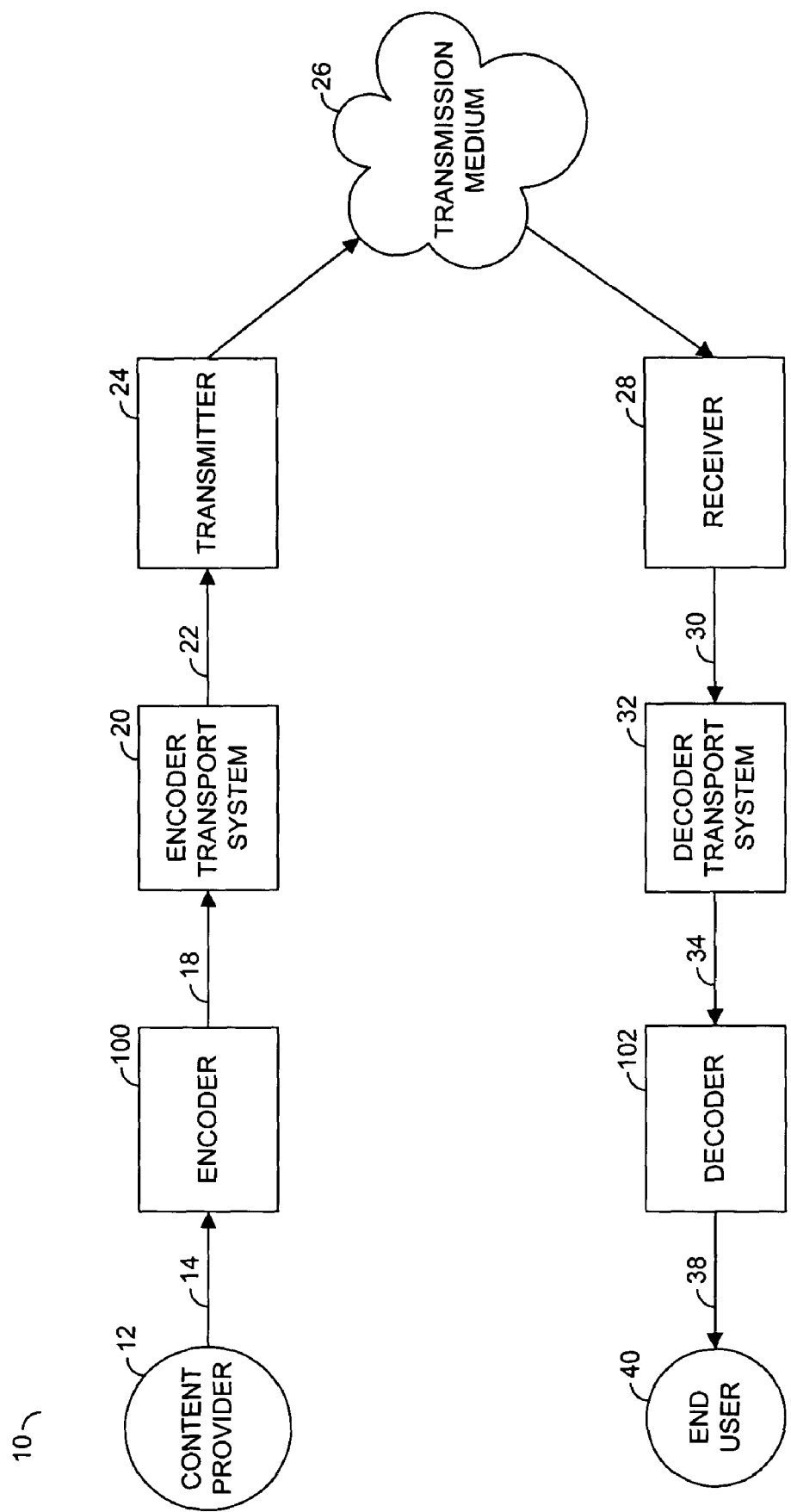
FIG. 1 is a block diagram illustrating various components of a compressed video transmission system.

Referring to FIG. 1, a block diagram of a system 10 is shown. In general, a content provider 12 presents video image, audio or other data 14 to be compressed and transmitted to an input of an encoder apparatus 100. The compressed data 18 from the encoder 100 may be presented to an encoder transport system 20. An output of the encoder transport system 20 generally presents a signal 22 to a transmitter 24. The transmitter 24 transmits the compressed data via a transmission medium 26.

On a receiving side of the system 10, a receiver 28 generally receives the compressed data bitstream from the transmission medium 26. The receiver 28 presents a bitstream 30 to a decoder transport system 32. The decoder transport system 32 generally presents the bitstream 30 via a link 34 to a decoder apparatus 102. The decoder 102 generally decompresses the data bitstream 30 and presents the data via a link 38 to an end user 40.

The present invention may be implemented in the encoder 100 and/or the decoder 102. The encoder 100 and/or the decoder 102 may provide up to three different syntax elements that may follow a CABAC termination. The decoder 102 may marginally increase processing complexity since the syntax element that follows a CABAC termination is no longer always known without additional contextual information.

A section of the current H.264 specification applicable to the present invention states: "If codIOffset is larger than or equal to codIRange, a value of 1 is assigned to binVal, no renormalization is carried out and CABAC decoding is terminated." When decoding END-OF-SLICE-FLAG, the last bit inserted in register codIOff set is RBSP_STOP_ONE_BIT. When decoding an I_PCM mode macroblock, the next bit decoded after terminating CABAC decoding could be either the syntax element PCM_ALIGNMENT_ZERO_BIT or a first bit of the syntax element PCM_BYTE.

The present invention implements a decoder 102 capable of parsing one of three potential syntax elements (e.g., RBSP_STOP_ONE_BIT, PCM_ALIGNMENT_ZERO_BIT, or PCM_BYTE) following a CABAC termination. The present invention enables a valid syntax that may be produced by the encoder 100 to produce a bitstream with slices containing I_PCM mode macroblocks in slices that switch from non-I_PCM mode macroblocks to I_PCM mode macroblocks (in macroblock scan order). The present invention may be used to produce efficiently compressed bitstreams containing I_PCM mode macroblocks.

While the present invention is described in the context of H.264/MPEG4-AVC encoders, decoders, and transcoders, other implementations may be implemented. For example, the present invention may potentially be used in future video standards that incorporate (i) an arithmetic entropy coder and (ii) an PCM macroblock mode.

Figure 2:
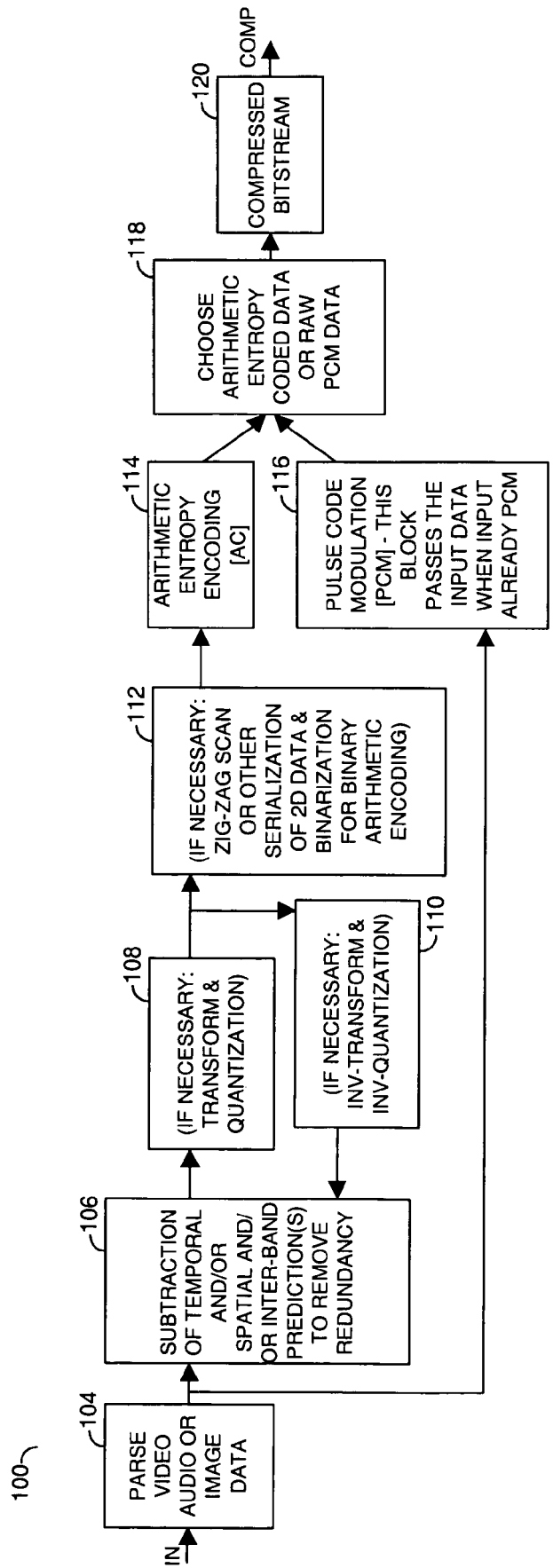
FIG. 2 is a block diagram of an encoding system.

Referring to FIG. 2, a diagram of the encoder apparatus 100 is shown. The encoder 100 generally comprises a block (or circuit) 104, a block (or circuit) 106, a block (or circuit) 108, a block (or circuit) 110, a block (or circuit) 112, a block (or circuit) 114, a block (or circuit) 116, a block (or circuit) 118, and a block (or circuit) 120. The block 104 generally parses a video, audio and/or image data signal (e.g., IN). The block 106 generally provides subtraction of temporal and/or spatial and/or inter-band prediction(s) to remove redundancy. The block 108 generally performs a transform and quantization process (if needed). The block 110 generally performs an inverse transform and inverse quantization and delay process (if needed). The block 112 generally performs a zig-zag scan (or other serialization) of two dimensional data and binarization for binary arithmetic encoding. The block 112 only performs the serialization functions if needed on a particular bitstream. The block 114 generally performs arithmetic entropy encoding (AC). The block 116 generally performs pulse code modulation (PCM) encoding. If the output data from the block 104 is already PCM data, the block 116 simply passes the PCM data to the block 118. The block 118 chooses either arithmetic entropy coded data or raw PCM data. The block 120 presents a compressed bitstream (e.g., COMP).

Figure 3:
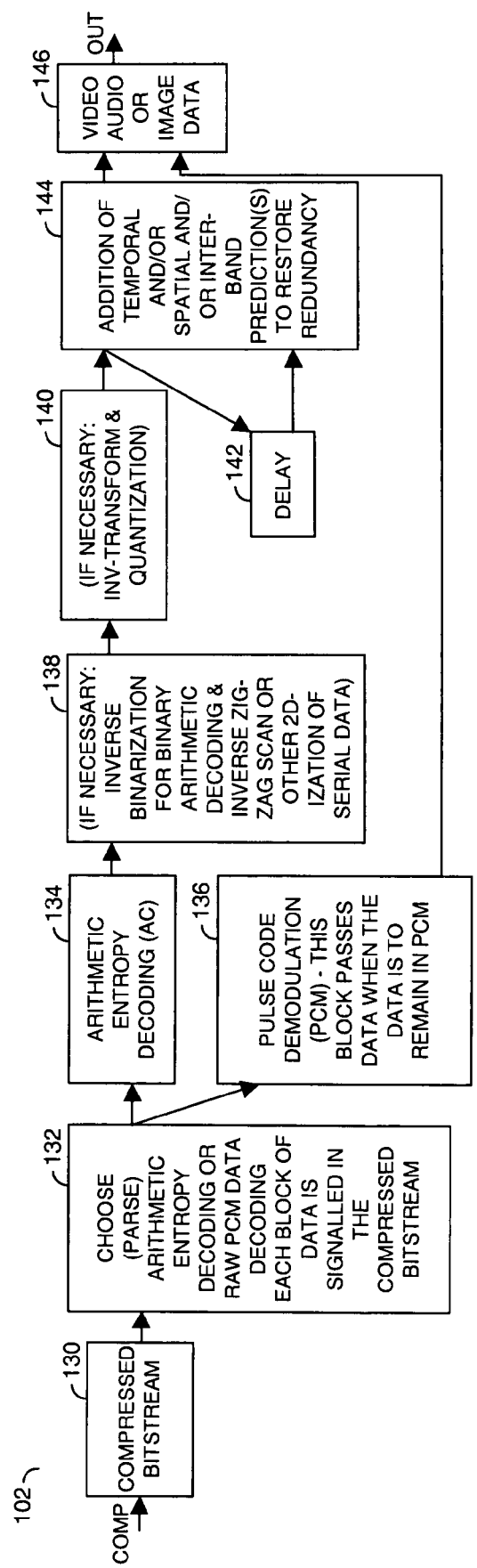
FIG. 3 is a block diagram of a decoding system.

Referring to FIG. 3, a diagram of the decoder apparatus 102 is shown. For H.264/MPEG4-AVC the choice between arithmetic entropy coded (AC) and PCM data may be made on each macroblock of data. In general, the decoder 102 reverses the steps performed by the encoder 100. In particular, the decoder 102 generally comprises a block (or circuit) 130, a block (or circuit) 132, a block (or circuit) 134, a block (or circuit) 136, a block (or circuit) 138, a block (or circuit) 140, a block (or circuit) 142, a block (or circuit) 144 and a block (or circuit) 146. The block 130 generally receives the compressed bitstream COMP (e.g., from the block 120). The block 132 generally parses the bitstream COMP by choosing arithmetic entropy decoding or presenting raw PCM data for each block of data as signaled in the compressed bitstream COMP. The block 134 generally performs arithmetic entropy decoding (AC). The block 136 generally performs pulse code demodulation. If the data signal is to remain as PCM data, the block 136 may simply pass the data to the block 146. The block 138 generally performs inverse binarization for binary arithmetic decoding and inverse zig-zag scan or other two-dimensionalization of the serial data. The block 138 may be an optional block. The block 140 generally performs inverse transform and quantization (if needed). The block 142 generally provides the delay of the output of the block 140 to present a separate input to the block 144. The block 144 generally performs addition of temporal and/or spatial and/or inter-band prediction(s) to restore redundancy. The block 146 generally combines the signals generated by the block 136 and the block 144 to present a video/audio and/or image data signal (e.g., OUT).

If the switch between entropy coding AC and PCM data were on the slice or picture level, there would be no need for the current invention. For example, in the H.264/MPEG4-AVC standard, the AC data would always be properly terminated through the pre-existing process for end-of-slice termination in the standard. Such termination would allow a clean and error-free transition to PCM data for the blocks of data following the termination.

This invention is generally implemented in the Arithmetic Entropy Coding/Decoding (AC) blocks of both the encoder 100 and/or the decoder 102. The present invention provides a new method for determining when to renormalize the arithmetic coding (before termination) when encoding/decoding the END-OF-SLICE-FLAG and the BIN-INDICATING-I_PCM mode flag.

In the new method, the conditions for performing renormalization and setting the current value BINVAL in the arithmetic encoder/decoder 114 and/or decoder 134 are the same for termination following either the END-OF-SLICE-FLAG or the BIN-INDICATING-I_PCM mode. By comparison, in the old method, the value BINVAL could be set to 1 and renormalization not performed only if the last bit inserted in the register CODIOFFSET was RBSP_STOP_ONE_BIT (i.e., only for encoding/decoding the END-OF-SLICE flag). For the old method, the value BINVAL could never be set to 0 and renormalization performed for encoding/decoding the BIN-INDICATING-I_PCM mode. The old method lacked a correct termination of the AC engine for encoding/decoding the BIN-INDICATING-I_PCM mode, preventing the possibility of macroblock-level switching in the middle of a slice (a group of macroblocks composing a portion of one video frame or field) of data from arithmetic coded macroblocks to PCM coded macroblocks.

Figure 4:
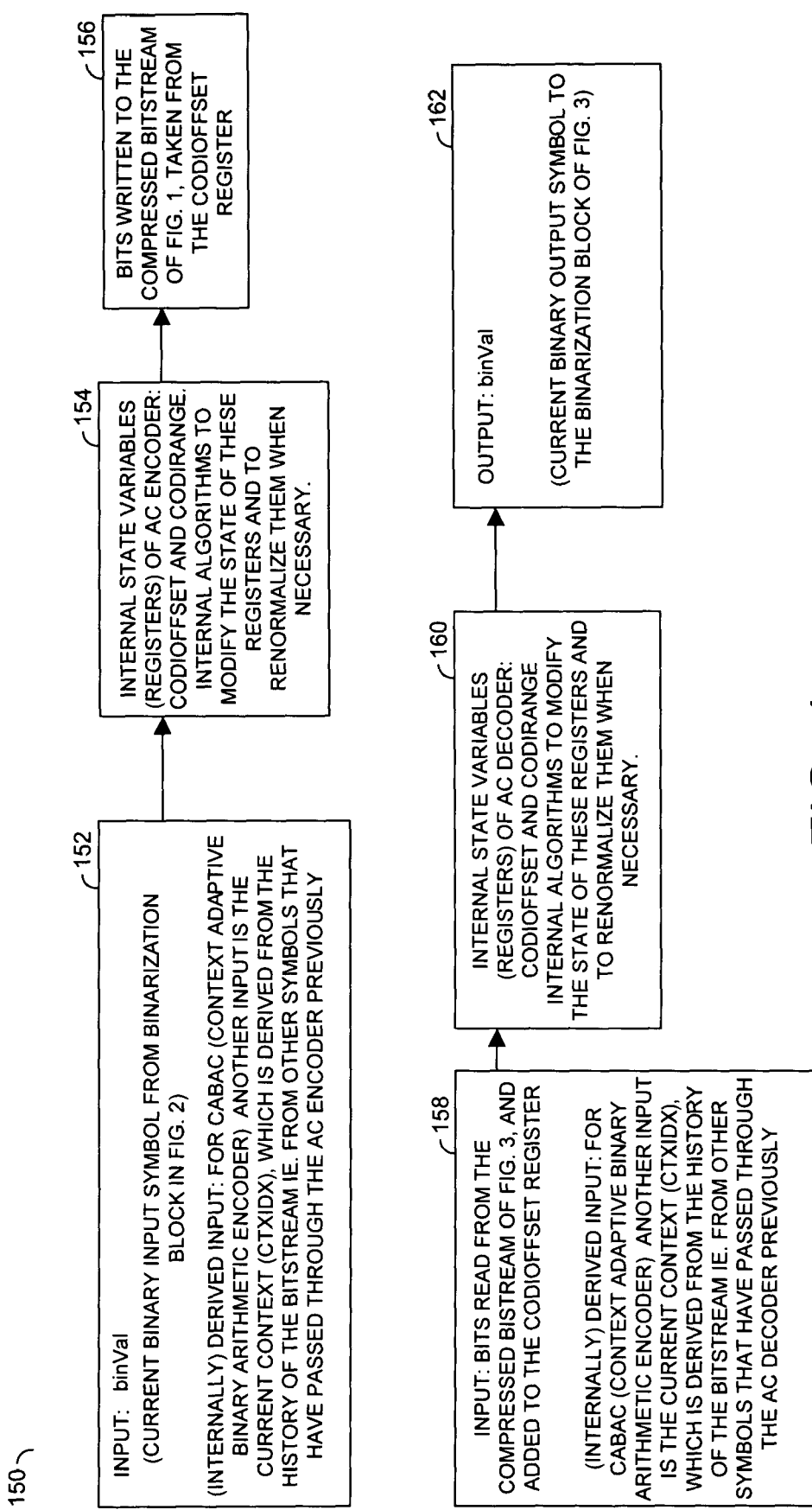
FIG. 4 is a block diagram of an arithmetic coding engine.

Referring to FIG. 4, a simplified block diagram of a binary arithmetic coding engine 150 is shown. The engine 150 generally comprises a block 152, a block 154, a block 156, a block 158, a block 160 and a block 162. The block 152 generally receives the value BINVAL (which is the current binary input symbol from the binarization block 112 of FIG. 2). The block 152 may also generate a context adaptive binary arithmetic encoder (CABAC) derived input (e.g., CTXTDX). The derived input CTXIDX may be a current context, which is derived from the history of the bitstream (e.g., from other symbols that have passed through the AC encoder previously).

The block 154 may generate internal state variables in registers of the AC encoder (e.g., CODIOFFSET and CODIRANGE). The block 154 may also execute internal procedures to modify the state of the registers and to renormalize the contents of the registers when necessary.

The block 156 may write bits to the compressed bitstream of FIG. 1, taken from the register CODIOFFSET. The block 158 may receive bits read from the compressed bistream of FIG. 3, and added to the register CODIOFFSET. The block 158 may also generate the CTXIDX internally derived input, which is derived from the history of the bitstream (e.g., from other symbols that have passed through the AC decoder previously).

The block 160 may generate the internal state variables in the registers of the AC decoder (e.g., CODIOFFSET and CODIRANGE). The block 160 may also execute a procedure to modify the state of the registers and to renormalize the contents of the registers when necessary. The block 162 may generate the value BINVAL as the current binary output symbol to the inverse binarization block 138 of FIG. 3.

The present invention is not necessarily limited to use only for binary arithmetic encoding, but may also apply to non-binary arithmetic encoding. However, non-binary encoding may result in the BINVAL being replaced with another value (e.g., SYMBOLVAL). Various other changes may also be implemented to the internal working of a non-binary arithmetic coding engine.

Figure 5:
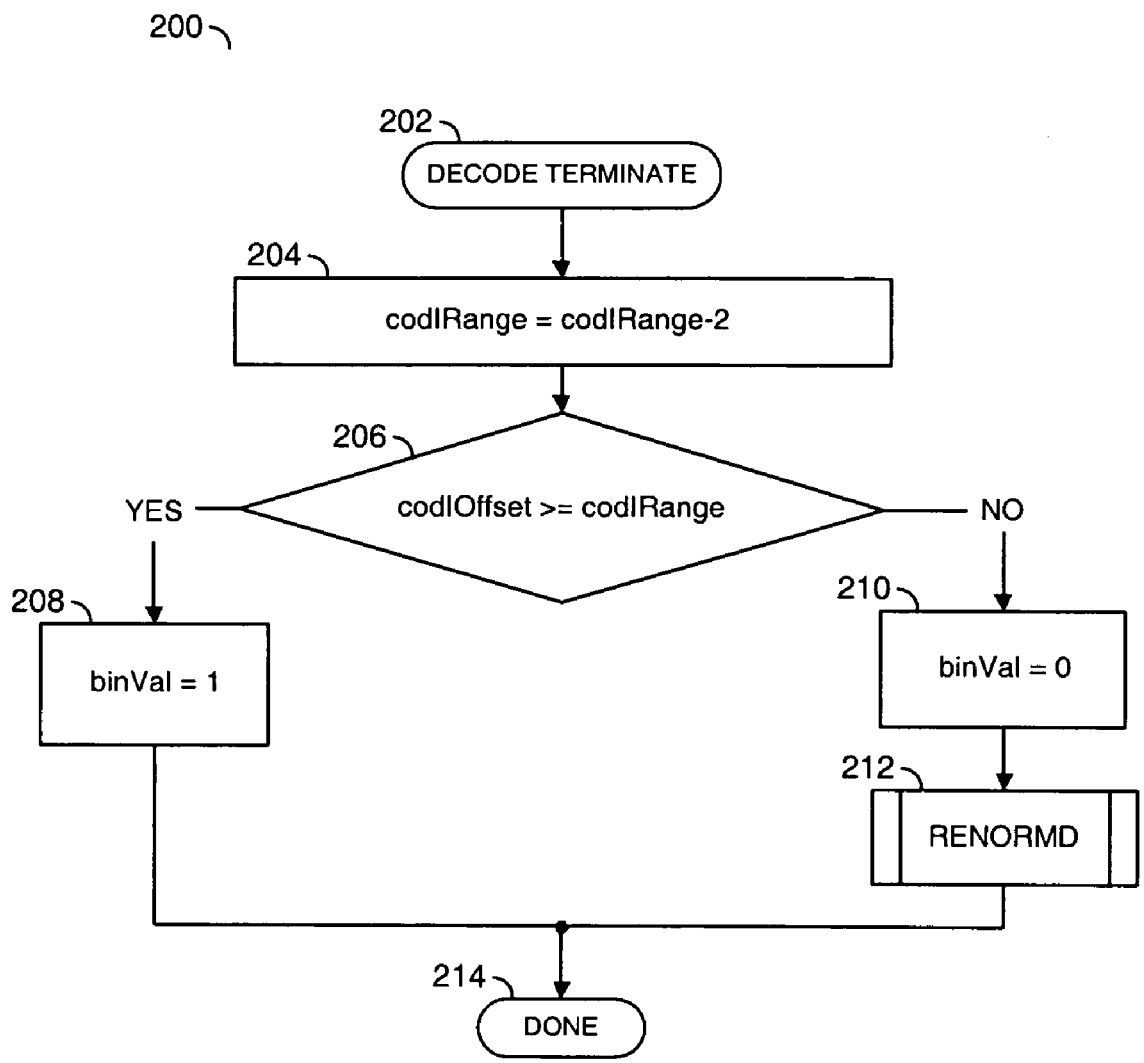
FIG. 5 is a flowchart of a decoding decision logic.

Referring to FIG. 5, a flowchart of a method (or process) 200 is shown. The method 200 generally comprises decoding a decision before CABAC termination that may be used in the arithmetic coding/decoding engines of FIGS. 2 and 3. The method 200 generally comprises a state 202, a state 204, a decision state 206, a state 208, a state 210, a state 212, and a state 214. The state 202 generally performs a decode terminate function. The state 204 generally decrements the first code range (e.g., CODIRANGE) by a value of two. The decision state 206 determines whether an offset (e.g., CODIOFFSET) is greater than or equal to the code range CODIRANGE. If so, the method 200 moves to the state 208 where the value BINVAL is set to 1. The method 200 then moves to the done state 214. If the decision state 206 determines that the code offset CODIOFESET is not greater than or equal to the code range CODIRANGE, the method 200 moves to the state 210. The state 210 sets the value BINVAL equal to 0 and the method 200 moves to the state 212. The state 212 provides a renormalization. The method 200 then moves to the done state 214.

The method 200 may be invoked when encoding/decoding the END-OF-SLICE-FLAG or the BIN-INDICATING-I_PCM mode. The method 200 generally illustrates arithmetic decoding, which is the standardized portion of the codec for H.264/MPEG4-AVC. In the state 206, an internal state register CODIRANGE is first decremented by 2, then compared with the register CODIOFESET. Depending on the result of the comparison the binary symbol value BINVAL is output with either a value 0 (after which renormalization of the internal state of the arithmetic coding engine must occur) or a value 1. Note that it is in the method of operation of the decode terminate process that the current invention differs from conventional approaches: namely prior art permitted only the 'NO' branch of decision block 206 to be taken for decoding of the BIN-INDICATING-I_PCM mode. In contrast, the conventional approach states that if the offset value CODIOFFSET is larger than or equal to the range value CODIRANGE, a value of 1 is assigned to BINVAL, no renormalization is carried out and CABAC decoding is terminated. In conventional approaches, the last bit inserted in the register CODIOFFSET is RBSP_STOP_ONE_BIT. In the new invention, other values (bit patterns) may be inserted as the last bit in the register CODIOFFSET, without impacting conformance to the H.264 standard. The effect of the additional bit patterns is that correct termination (e.g., decoding of the BINVAL symbol and renormalization of the internal state registers of the AC engine) may now be accomplished when decoding the BIN-INDICATING-I_PCM mode. The effect of the additional bit patterns is that correct termination (e.g., decoding of the BINVAL symbol and renormalization of the internal state registers of the AC engine) may now be accomplished when decoding the BIN-INDICATING-I_PCM mode.

The RenormD block 212 is a process that generally changes the values of CODIOFFSET and CODIRANGE dependent only upon the current values, and additional bits that may be added to the register CODIOFFSET (read from the bistream) during the operation of the process.

While the invention has been particularly shown and described with reference to the preferred embodiments thereof, it will be understood by those skilled in the art that various changes in form and details may be made without departing from the spirit and scope of the invention.

The invention claimed is:

1. A method for decoding a bitstream in a decoding system, comprising the steps of:
   (A) accepting a common slice containing a plurality of macroblocks at an input to said decoding system, wherein said plurality of macroblocks switch from non-I_PCM mode macroblocks to I_PCM mode macroblocks in macroblock scan order;
   (B) generating a first signal comprising said non-I_PCM mode macroblocks and a second signal comprising said I_PCM mode macroblocks using a parser, said parser parsing the common slice in said bitstream, including parsing a first syntax element indicating an end of said slice and a second syntax element representing said I_PCM mode macroblocks, said first or second syntax element following an entropy coding termination;
   (C) generating a third signal using a decoder, said decoder entropy decoding said first signal; and
   (D) generating a video signal by combining said second signal and said third signal.

2. The method according to claim 1, wherein step (B) comprises the sub-step of:
   renormalizing said entropy decoding by setting any one of a plurality of predetermined values as a last value for said entropy decoding.

3. The method according to claim 1, further comprising the step of:
   terminating said entropy decoding by setting any one of a plurality of predetermined values as a last value for said entropy decoding.

4. The method according to claim 1, further comprising the step of:
   comparing an offset value to a range value.

5. The method according to claim 4, further comprising the step of:
   renormalizing said entropy decoding in response to said offset value being at least as large as said range value.

6. The method according to claim 1, further comprising the step of:
   demodulating said second signal prior to combining with said third signal.

7. The method according to claim 6, wherein said demodulating comprises pulse code demodulating.

8. An apparatus comprising:
   a parser configured to (i) accept a common slice in a bitstream, the common slice containing a plurality of macroblocks, wherein said plurality of macroblocks switch from non-I_PCM mode macroblocks to I_PCM mode macroblocks in macroblock scan order and (ii) generate a first signal comprising said non-I_PCM mode macroblocks and a second signal comprising said I_PCM mode macroblocks by parsing the common slice in the bitstream, wherein said parser is further configured to parse a first syntax element indicating an end of said slice and a second syntax element representing said I_PCM mode macroblocks, said first or second syntax element following an entropy coding termination;

a decoder configured to generate a third signal by entropy decoding said first signal; and a circuit configured to generate a video signal by combining said second signal and said third signal.

9. The apparatus according to claim 8, wherein said entropy decoding comprises a binary arithmetic decoding.

10. The apparatus according to claim 9 wherein said arithmetic decoding comprises a context-based adaptive binary arithmetic decoding.

11. The apparatus according to claim 8, further comprising a demodulator configured to pulse code demodulate said second signal.

12. An apparatus comprising:

means for accepting a common slice in a bitstream, said common slice containing a plurality of macroblocks, wherein said plurality of macroblocks switch from non-I_PCM mode macroblocks to I_PCM mode macroblocks in macroblock scan order;

means for generating a first signal comprising said non-I_PCM mode macroblocks and a second signal comprising said I_PCM mode macroblocks by parsing said common slice in said bitstream, including parsing a first syntax element indicating an end of said slice and a second syntax element representing said I_PCM mode macroblocks, said first or second syntax element following an entropy coding termination;

means for generating a third signal by entropy decoding said first signal; and means for generating a video signal by combining said second signal and said third signal.

13. A method for encoding a video signal, comprising the steps of:

(A) generating a first signal comprising non-PCM coded data and a second signal comprising PCM coded data using a parser, said parser parsing said video signal;

(B) generating a third signal using an encoder, said encoder entropy encoding said first signal; and (C) generating a bitstream by combining said second signal and said third signal within a common slice, wherein said common slice comprises pulse code modulation (PCM) coded data and non-PCM coded data.

14. The method according to claim 13, wherein step (B) comprises the sub-step of:

renormalizing said entropy encoding by setting any one of a plurality of predetermined bit patterns as a last value for said entropy encoding.

15. The method according to claim 14, wherein said predetermined bit patterns comprise a mode for non-encoded pulse code modulated data.

16. The method according to claim 13, further comprising the step of:

terminating said entropy encoding by setting any one of a plurality of predetermined values as a last bit for said entropy encoding.

17. The method according to claim 13, further comprising the step of:

encoding data in said second signal by pulse code modulation (PCM).

18. The method according to claim 13, further comprising the steps of:

generating a fourth signal and a fifth signal by parsing said common slice in said bitstream;

generating a sixth signal by entropy decoding said fourth signal; and generating a copy of said video signal by combining said fifth signal and said sixth signal.

19. The method according to claim 1, wherein said common slice comprises one or more macroblocks encoded using arithmetic entropy coding (AC) and one or more macroblocks encoded using pulse code modulation (PCM).

20. The method according to claim 19, wherein said arithmetic entropy coding comprises context-based adaptive binary arithmetic coding (CABAC).

21. The apparatus according to claim 11, wherein said demodulator is further configured to pulse code demodulate said second signal in a first mode and pass said second signal in a second mode.

22. The method according to claim 13, wherein said second signal comprises pulse code modulated (PCM) data, said third signal comprises arithmetic entropy coded (AC) data and generating said bitstream comprises selecting either said pulse code modulated data or said arithmetic entropy coded data for each macroblock of said common slice.

23. The method according to claim 1, further comprising the step of:

parsing any of three potential syntax elements contained in the group consisting of a RBSP_STOP_ONE_BIT, a PCM_ALIGNMENT_ZERO_BIT, and a PCM_BYTE.

24. The apparatus according to claim 8, wherein said parser is further configured to parse any of three potential syntax elements contained in the group consisting of a RBSP_STOP_ONE_BIT, a PCM_ALIGNMENT_ZERO_BIT, and a PCM_BYTE.

25. The apparatus according to claim 24, wherein said syntax elements follow a context-based adaptive binary arithmetic coding (CABAC) termination.

26. The method according to claim 23, wherein said syntax elements follow a context-based adaptive binary arithmetic coding (CABAC) termination.

27. The method according to claim 13, wherein said common slice comprises a plurality of macroblocks and said plurality of macroblocks switch from non-I_PCM mode macroblocks to I_PCM mode macroblocks in macroblock scan order.

28. The method according to claim 27, wherein said common slice further comprises at least one of a first syntax element indicating an end of said slice and a second syntax element representing said I_PCM mode macroblocks, said first or second syntax element following an entropy coding termination.

29. The method according to claim 13, wherein said common slice further comprises any of three potential syntax elements contained in the group consisting of a RBSP_STOP_ONE_BIT, a PCM_ALIGNMENT_ZERO_BIT, and a PCM_BYTE.

30. The method according to claim 29, wherein said syntax elements follow a context-based adaptive binary arithmetic coding (CABAC) termination.

* * * * *